United States Patent [19]

Fischer et al.

[11] Patent Number: 5,149,509
[45] Date of Patent: Sep. 22, 1992

[54] APPARATUS FOR A CATALYTIC REACTION OF A GAS MIXTURE, WHICH CONTAINS H2S AND SO2, BY THE CLAUS PROCESS

[75] Inventors: Herbert Fischer, Lollar; Wolfgang Nehb, Frankfurt, both of Fed. Rep. of Germany

[73] Assignee: Metallgesellschaft Aktiengesellschaft, Frankfurt, Fed. Rep. of Germany

[21] Appl. No.: 562,548

[22] Filed: Aug. 3, 1990

[30] Foreign Application Priority Data

Aug. 8, 1989 [DE] Fed. Rep. of Germany ....... 3926105

[51] Int. Cl.$^5$ ............................................. B01D 53/36
[52] U.S. Cl. ................................... 422/177; 422/173; 422/200; 422/201; 422/220; 422/230; 422/242; 422/244
[58] Field of Search ............... 422/173, 177, 200, 201; 165/138, 920; 423/226, 230, 242, 244

[56] References Cited

U.S. PATENT DOCUMENTS

| | | | |
|---|---|---|---|
| 2,580,827 | 1/1952 | Payne | 422/200 |
| 2,855,449 | 10/1958 | Owen | 422/201 |
| 3,393,050 | 7/1968 | Hunt et al. | |
| 3,927,987 | 12/1975 | Winter, III et al. | 422/200 |
| 4,219,533 | 9/1980 | Hartlapp et al. | 422/200 |

FOREIGN PATENT DOCUMENTS

| | | |
|---|---|---|
| 3708937 | 10/1988 | Fed. Rep. of Germany . |
| 269792 | 7/1989 | Fed. Rep. of Germany . |
| 62-186935 | 8/1987 | Japan . |
| 357698 | 1/1973 | U.S.S.R. . |
| 886725 | 11/1981 | U.S.S.R. . |

*Primary Examiner*—Robert J. Warden
*Assistant Examiner*—Timothy M. McMahon
*Attorney, Agent, or Firm*—Sprung Horn Kramer & Woods

[57] ABSTRACT

The apparatus comprises a container which has a central cooling chamber and an annular chamber which surrounds the cooling chamber and contains catalyst. The gas mixture to be reacted contains H$_2$S and SO$_2$ enters the annular chamber and first flows through the catalyst. The cooling chamber contains at least one coolant line and is provided with a passage for gas mixture coming from the annular chamber and with a gas outlet. The cooling chamber is provided at its bottom end with a drain for the liquid elementary sulfur.

11 Claims, 1 Drawing Sheet

APPARATUS FOR A CATALYTIC REACTION OF A GAS MIXTURE, WHICH CONTAINS H2S AND SO2, BY THE CLAUS PROCESS

DESCRIPTION

This invention relates to an apparatus for a catalytic reaction of a gas mixture, which contains $H_2S$ and $SO_2$, by the Claus process to produce elementary sulfur vapor and for cooling the gas mixture to condense the elementary sulfur, which is withdrawn as a liquid.

Apparatuses of that kind are known and have been described, e.g., in European Patent 0 132 996. They comprise a reactor, which contains a catalyst and is succeeded by a condenser. The liquid elementary sulfur which is withdrawn from the condenser has been produced by a reaction which can be represented in a simplified form by $2H_2S + SO_2 \rightarrow 3S + 2H_2O$. In known Claus process plants, a substantial part of the overall investment is required for the structural steelwork and the piping and comprises numerous flanged joints and a considerable expenditure is required to ensure that said joints are tight.

For this reason it is an object of the invention to simplify the design of the apparatus described hereinabove and to reduce the cost of the apparatus.

This is accomplished in accordance with the invention by the provision of a container which contains a centrally disposed cooling chamber and an annular chamber which surrounds the cooling chamber and contains catalyst and is provided with an inlet for the gas mixture, wherein the cooling chamber contains at least one coolant line and is provided with a passage for the flow of the gas mixture from the annular chamber and a gas outlet and at the lower end of the cooling chamber with an outlet for the liquid elementary sulfur.

In the apparatus in accordance with the invention the gas mixture may in one case flow downwardly in the annular chamber and upwardly in the cooling chamber or in another case may be caused to flow first upwardly through the annular chamber and subsequently downwardly through the cooling chamber. In both cases the wall confining the cooling chamber on the outside will confine the catalyst-containing annular chamber on the inside. There will be no need for lines and flanged joints between the annular space and the cooling chamber and it has been found that the outside diameter of the container needs to be only slightly larger than the outside diameter of a container which is of known design and contains the catalyst but no cooling chamber. The inside diameter of the outer wall of the annular chamber is usually 1.5 to 4 times the inside diameter of the cooling chamber.

The cooling chamber contains coolant lines, which by an indirect heat exchange effect a cooling of the gas mixture which contains elementary sulfur, which is thus condensed. One or more coolant lines may be arranged in various ways. In a simple arrangement, the cooling chamber is provided with a plurality of vertical coolant lines and the liquefied sulfur flows down on the outside of said lines. The coolant may consist of water which boils under pressure. Alternatively, other liquid coolants known per se may be used, such as organic heat transfer liquids or molten salts.

A pressure of 1 to 20 bars or a higher pressure may be maintained in the container. The integrated apparatus can be manufactured at particularly low cost if the apparatus is designed for an operation under superatmospheric pressure.

BRIEF DESCRIPTION OF THE DRAWINGS

Embodiments of the apparatus in accordance with the invention will be explained with reference to the drawing, in which.

Figure 1:
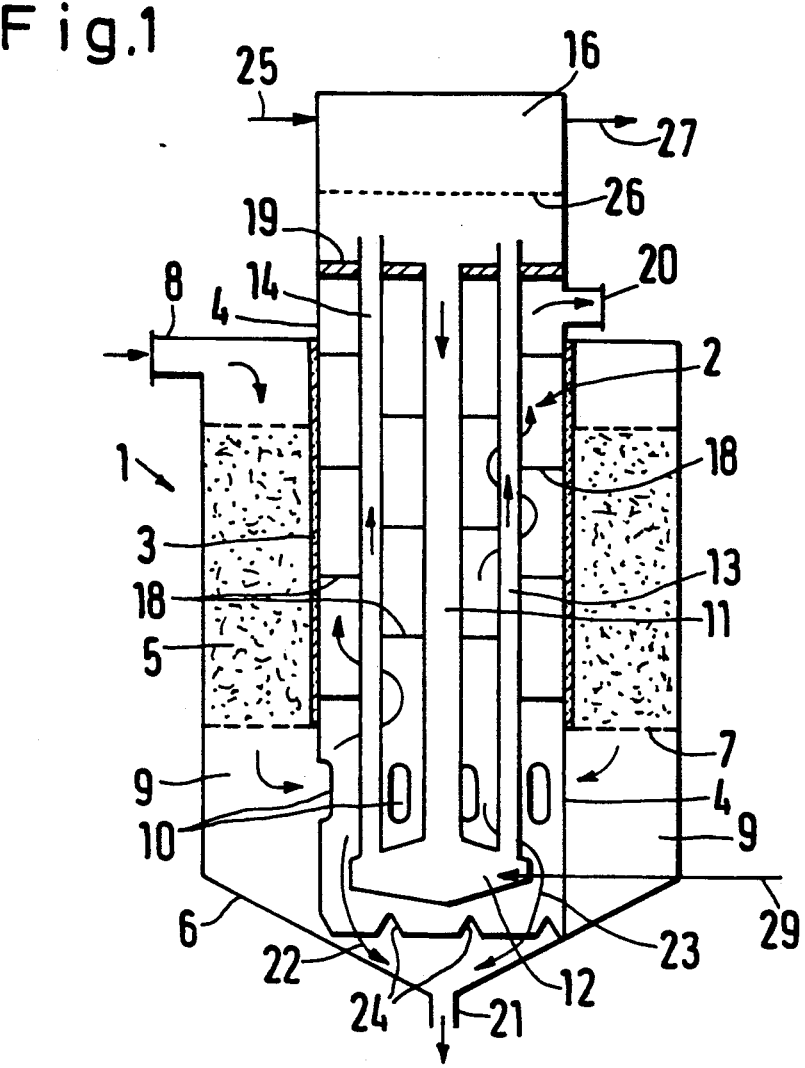
FIG. 1 is a longitudinal sectional view showing a first embodiment and FIG. 2 is a longitudinal sectional view showing a second embodiment.

The main parts of the apparatus shown in FIG. 1 are the cylindrical container 1 and the tubular cooling chamber 2 contained in said container. A portion of the tubular wall 4 of the cooling chamber 2 is provided with heat insulation 3, e.g., with a refractory lining. A packed bed 5 of catalyst consisting, e.g., of granular $Al_2O_3$ or $TiO_2$, is contained in the annular chamber between the outside surface of the container 1 and the heat insulation 3. The catalyst bed is supported by a grate 7. The container is provided on the underside with a funnel-shaped bottom 6.

The gas mixture which is to be reacted contains $H_2O$ and $SO_2$ and enters the container 1 at temperatures of about 180° to 350° C. through an inlet 8 and flows down through the packed bed 5 of catalyst. Elementary sulfur and water are formed at the catalyst from $H_2S$ and $SO_2$ and heat is liberated at the same time. The gas mixture which contains elementary sulfur vapor flows from the space 9 below the grate 7 through passages 10 in the wall 4 into the cooling chamber 2. The cooling chamber contains a central line 11, in which cooling water is conducted from a steam header 16 down to a manifold chamber 12, from which the cooling water, which is boiling, rises by natural circulation through a plurality of riser pipes 13 and 14 back to the steam header 16.

The gas mixture rising in the cooling chamber 2 is repeatedly deflected by annular disks 18 for intensifying the contact with the cooling water lines and leaves the cooling chamber 2 through the gas outlet 20. The cooling chamber is closed at its top by a tube plate 19.

Condensed elementary sulfur flows down on the outside surfaces of the cooling water lines and past the outside surface of the manifold chamber 12, flows through the open bottom end of the cooling chamber to a drain 21, as is indicated by the arrows 22 and 23. The bottom edge portion of the wall 4 of the cooling chamber is formed with holes 24 so that any liquid sulfur which has already been formed in the chamber 9 can also flow off through the drain 21. In the cooling chamber 2 the annular disks 18 by which the rising gas is deflected act as effective separators for the liquid sulfur so that there is no need for additional separating means in or after the gas outlet 20. At the outlet 20 the gas has a temperature approximately in the range from 150° to 200° C. The liquid sulfur in the drain 21 is at a temperature of about 160° to 170° C.

The steam header 16 is supplied through a supply line 25 with cooling water which, owing to natural circulation, enters the central line 11. The water level 26 is indicated by a dotted line. Water vapor which is formed escapes through line 27.

During the starting-up, the cooling water lines and the manifold chamber 12 are filled with cooling water which, before the beginning of the operation, must be heated to a temperature above the solidification temperature of the sulfur. For that purpose a start-up heater is provided, which in the present case consists of a line 29 for supplying water vapor. That supply line opens into the manifold chamber 12 and ensures that the cooling water will be at a sufficiently high temperature before the cooling water is used to condense the elementary sulfur. The arrangement shown on the drawing may be modified in that the line 29 extends, e.g., through the header 16 and in the central line 11 as far as to the manifold chamber 12.

Figure 2:
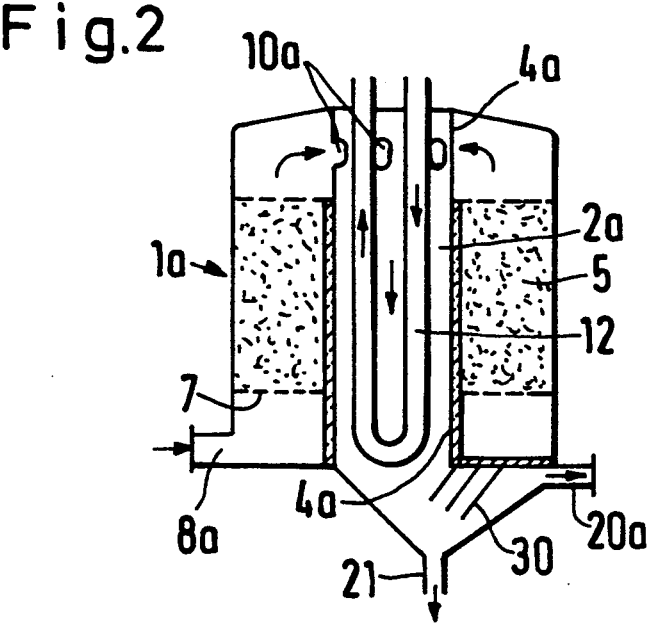

In the apparatus shown in the simplified FIG. 2 a gas inlet 8a is disposed below the packed bed 5 of catalyst so that the gas mixture to be reacted rises through the catalyst in the annular chamber between the cooling chamber 2a and the outer wall of the container 1a. The gas mixture which contains elementary sulfur enters the cooling chamber through openings 10a in the wall 4a of the cooling chamber and in the latter flows down along the coolant line 12. Deflecting means provided in the cooling chamber 2a have not been shown for the sake of simplicity. The liquid elementary sulfur flows off through the drain 21 and the gas mixture leaves the container through the gas outlet 20a. A diagrammatically indicated separator 30 ensures that the content of elementary sulfur in the gas which escapes through the outlet 20a will be minimized.

It will be understood that the specification and examples are illustrative but not limitative of the present invention and that other embodiments within the spirit and scope of the invention will suggest themselves to those skilled in the art.

We claim:

1. A reactor for the catalytic reaction of a gas mixture, which contains $H_2S$ and $SO_2$, by the Claus process to produce elementary sulfur vapor and for cooling the gas mixture to condense the elementary sulfur, which is withdrawn as a liquid, comprising a container having a centrally disposed cooling chamber and an annular chamber, the annular chamber surrounding the cooling chamber and being provided with an inlet for the gas mixture, granular catalyst to produce elementary sulfur from $H_2S$ and $SO_2$ within the annular chamber, the cooling chamber containing at least one coolant line and being provided with a passage for the flow of the gas mixture from the annular chamber, so that the gas mixture passes over the coolant line with a gas outlet and at its lower end with an outlet for liquid elementary sulfur.

2. A reactor according to claim 1, wherein the cooling chamber contains a plurality of vertical lines for conducting a liquid coolant.

3. A reactor according to claim 1, wherein the cooling chamber is provided with a manifold chamber for inflowing and outflowing liquid coolant.

4. A reactor according to claim 1, wherein the cooling chamber communicates at its top end with a steam header, which is provided with a supply line for cooling liquid and with a steam discharge line.

5. A reactor according to claim 1, wherein the cooling chamber is provided with means for deflecting the gas mixture between the passage and the gas outlet, thereby to intensify the contact between the gas and coolant in the coolant line.

6. A reactor according to claim 1, wherein the inlet for the gas mixture is provided at the upper portion of the annular chamber, the passage for the gas mixture is provided at the lower portion of the cooling chamber, and the gas outlet is provided at the upper portion of the cooling chamber.

7. A reactor according to claim 1, wherein the inlet for the gas mixture is arranged at the lower portion of the annular chamber, the passage for the gas mixture is provided at the upper portion of the cooling chamber, and the gas outlet is provided at the lower portion of the cooling chamber.

8. A reactor according to claim 1, wherein the inside diameter of the outer wall defining the annular chamber is 1.5 to 4 times the inside diameter of the cooling chamber.

9. A reactor according to claim 1, wherein the container is designed for a pressure of 1 to 20 bars.

10. A reactor according to claim 1, including a grate within said annular chamber between the gas inlet and the passage for the flow of the gas mixture from the annular chamber, the grate supporting the granular catalyst so that the gas mixture must pass through said catalyst.

11. A process for the catalytic reaction of an initial gas mixture which contains $H_2S$ and $SO_2$ by the Claus process to produce elementary sulfur vapor, for cooling the resulting gas mixture to condense the elementary sulfur, and for withdrawing the condensed sulfur as a liquid, comprising introducing the initial gas mixture through the inlet of a container having a centrally disposed cooling chamber and an annular chamber, the annular chamber surrounding the cooling chamber, passing the gas mixture through a bed of catalyst within the annular chamber, said catalyst capable of converting $H_2S$ and $SO_2$ into elementary sulfur cooling the cooling chamber with coolant introduced through at least one coolant line, passing the resulting gas mixture through a passage from the annular chamber into the cooling chamber and over the coolant line said cooling chamber provided with a gas outlet and at its lower end with an outlet for liquid elementary sulfur, withdrawing by-product gas through the cooling chamber gas outlet, and withdrawing liquid elementary sulfur through the cooling chamber lower end outlet.

* * * * *

UNITED STATES PATENT AND TRADEMARK OFFICE
CERTIFICATE OF CORRECTION

PATENT NO. : 5,149,509

DATED : September 22, 1992

INVENTOR(S) : Fischer et al.

It is certified that error appears in the above-identified patent and that said Letters Patent is hereby corrected as shown below:

Title Page     FOREIGN PATENT DOCUMENTS:    Delete " 3708937 " and substitute -- 3708957 --

Signed and Sealed this

Eighteenth Day of January, 1994

Attest:

BRUCE LEHMAN

Attesting Officer     Commissioner of Patents and Trademarks